US011936514B2

(12) United States Patent
Mihara et al.

(10) Patent No.: US 11,936,514 B2
(45) Date of Patent: Mar. 19, 2024

(54) PROCESSING APPARATUS, PROCESSING SYSTEM, PROCESSING METHOD AND PROCESSING PROGRAM

(71) Applicant: Nippon Telegraph and Telephone Corporation, Tokyo (JP)

(72) Inventors: Kotaro Mihara, Musashino (JP); Toshifumi Sano, Musashino (JP); Nobuhiro Kimura, Musashino (JP); Minoru Sakuma, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 16 days.

(21) Appl. No.: 17/631,043

(22) PCT Filed: Aug. 20, 2019

(86) PCT No.: PCT/JP2019/032408
§ 371 (c)(1),
(2) Date: Jan. 28, 2022

(87) PCT Pub. No.: WO2021/033255
PCT Pub. Date: Feb. 25, 2021

(65) Prior Publication Data
US 2022/0321399 A1  Oct. 6, 2022

(51) Int. Cl.
*H04L 41/0654* (2022.01)
*H04L 41/40* (2022.01)

(52) U.S. Cl.
CPC .......... *H04L 41/0654* (2013.01); *H04L 41/40* (2022.05)

(58) Field of Classification Search
CPC . H04L 41/40; H04L 41/0654; H04L 41/0672; H04L 41/0681; H04L 41/0668;
(Continued)

(56) References Cited

U.S. PATENT DOCUMENTS

2016/0294704 A1* 10/2016 Fan ..................... H04L 41/0893
2016/0328258 A1* 11/2016 Iwashina ............... G06F 9/5077
(Continued)

FOREIGN PATENT DOCUMENTS

WO    WO 2016/125387    8/2016

OTHER PUBLICATIONS

[No Author Listed] [online], "Masakari," OpenStack wiki, available on or before Mar. 17, 2019, retrieved on Jun. 25, 2019, retrieved from URL <https://wiki.openstack.org/wiki/Masakari>, 7 pages (with English Translation).
(Continued)

*Primary Examiner* — Greg C Bengzon
(74) *Attorney, Agent, or Firm* — Fish & Richardson P.C.

(57) ABSTRACT

A processing apparatus includes a virtualization control unit configured to virtualize hardware, and a network providing unit configured to provide a network function by using a resource virtualized by the virtualization control unit. The network providing unit includes a notification reception unit configured to receive, from a management apparatus configured to manage the virtualization control unit, notification data including a first countermeasure for a first fault caused in the virtualization control unit, a detection unit configured to detect a second fault caused in the network providing unit and generate detection data including a second countermeasure for the second fault, and a countermeasure unit configured to execute a countermeasure associated with a condition satisfied by the notification data or the detection data with reference to priority data indicating a countermeasure given priority in a case where a predetermined condition is satisfied, out of the first countermeasure and the second countermeasure.

7 Claims, 10 Drawing Sheets

(58) Field of Classification Search
CPC ............. H04L 41/5025; H04L 41/0686; H04L 41/0645; H04L 41/0659; H04L 41/0627; H04L 41/0897; H04L 41/5054; H04L 43/20; G06F 2009/45595; G06F 9/45558; G06F 9/45533; G06F 11/0712; G06F 11/079; G06F 11/0793; G06F 9/5077; G06F 9/5083; G06F 9/5038
See application file for complete search history.

(56) References Cited

U.S. PATENT DOCUMENTS

| | | | |
|---|---|---|---|
| 2017/0141944 A1* | 5/2017 | Lee | H04L 41/04 |
| 2017/0214544 A1* | 7/2017 | Lin | H04W 48/18 |
| 2018/0024898 A1 | 1/2018 | Yoshikawa | |
| 2018/0123870 A1* | 5/2018 | Xue | H04L 41/0893 |
| 2018/0150345 A1* | 5/2018 | Porwal | G06F 11/0724 |
| 2019/0155632 A1* | 5/2019 | Toy | G06F 11/0793 |
| 2020/0067782 A1* | 2/2020 | Yousaf | G06F 9/45558 |
| 2021/0165476 A1* | 6/2021 | Menzel | G06F 1/28 |
| 2021/0351992 A1* | 11/2021 | Sethi | H04L 12/46 |
| 2022/0083245 A1* | 3/2022 | Kant | G06F 3/0632 |

OTHER PUBLICATIONS

Mibu, "OPNFV Doctor—OpenStack Latest Information Seminar," VirtualTech Japan, Inc., Jul. 26, 2017, retrieved from URL <https://www.slideshare.net/VirtualTech-JP/opnfv-doctor>, 9 pages (with English Translation).

* cited by examiner

Fig. 5

| CONDITION | PRIORITY TARGET |
|---|---|
| DETECTION ENTITY OF FAULT | INSIDE |
| CONTENTS OF COUNTERMEASURE | SYSTEM SWITCHING |
| CONTENTS OF FAULT | ····· |
| ····· | ····· |

123 PRIORITY DATA

113 NOTIFICATION DATA

SYSTEM SWITCHING
AFTER SYSTEM SWITCHING IS PERFORMED,
PERFORM PH2.5 RESTART IN NEW SBY SYSTEM (b)

112 DETECTION DATA

PH2.5 RESTART
PERFORM PH2.5 RESTART IN STATE OF
ACT SYSTEM

PROCESSING APPARATUS, PROCESSING SYSTEM, PROCESSING METHOD AND PROCESSING PROGRAM

CROSS-REFERENCE TO RELATED APPLICATIONS

This application is a National Stage application under 35 U.S.C. § 371 of International Application No. PCT/JP2019/032408, having an International Filing Date of Aug. 20, 2019. The disclosure of the prior application is considered part of the disclosure of this application, and is incorporated in its entirety into this application.

TECHNICAL FIELD

The present invention relates to a processing apparatus, a processing system, a processing method, and a processing program.

BACKGROUND ART

In recent years, a network functions virtualization (NFV) technology has been developing rapidly (see NPL 1, NPL 2). NFV is a method of implementing a function of network equipment as software (virtual machine) on a platform in which general-purpose hardware is virtualized. A function of network equipment mounted on a virtualized substrate is referred to as a virtual network function (VNF). NFV achieves flexible scaling, improved equipment utilization efficiency, maintenance work efficiency, and the like.

In NFV platform, management and orchestration (MANO), a high availability (HA) solution for realizing high reliability and high availability has also been proposed. The HA solution allows the outside of a VNF such as hardware faults of the platform and supervisory faults to be monitored and controlled.

In voice communication systems, high reliability and availability required for social infrastructures has been achieved. Voice communication system is capable of advanced monitoring and controlling of faults. In a system requiring high reliability and availability such as a voice communication system, it is suitable to apply an NFV technique.

CITATION LIST

Non Patent Literature

NPL 1: Open Stack, "Masakari," [online], [retrieved Aug. 5, 2019], Internet <URL: https://wiki.openstack.org/wiki/Masakari>

NPL 2: Ryota Mibu "OPNFV.," [online], [retrieved Aug. 5, 2019], Internet <URL: https://www.slideshare.net/VirtualTech-JP/opnfv-doctor>

SUMMARY OF THE INVENTION

Technical Problem

In MANO, a fault inside a VNF cannot be monitored. Methods of monitoring a fault inside a VNF include a method using a fault-tolerant function used in a case where existing network equipment is adopted. However, since the outside of a VNF is monitored and controlled in an NFV platform, a countermeasure proposed by a fault-tolerant function inside the VNF and a countermeasure proposed through monitoring and controlling outside the VNF may conflict with each other.

In particular, a fault outside a VNF induces a VNF fault, and thus faults outside and inside the VNF may occur in a complex manner. In such a case, determination on the NFV platform and determination in the VNF conflict with each other, and thus the VNF needs to select any of countermeasures.

The present invention is contrived in view of the circumstances described above, and an object of the present invention is to provide a technique for allowing a VNF to appropriately cope with a fault.

Means for Solving the Problem

A processing apparatus according to an aspect of the present invention includes a virtualization control unit configured to virtualize hardware, and a network providing unit configured to provide a network function by using a resource virtualized by the virtualization control unit. The network providing unit includes a notification reception unit configured to receive, from a management apparatus configured to manage the virtualization control unit, notification data including a first countermeasure for a first fault caused in the virtualization control unit, a detection unit configured to detect a second fault caused in the network providing unit and generate detection data including a second countermeasure for the second fault, and a countermeasure unit configured to execute a countermeasure associated with a condition satisfied by the notification data or the detection data with reference to priority data indicating a countermeasure given priority in a case where a predetermined condition is satisfied, out of the first countermeasure and the second countermeasure.

A processing system according to an aspect of the present invention includes a processing apparatus including a virtualization control unit configured to virtualize hardware and a network providing unit configured to provide a network function by using a resource virtualized by the virtualization control unit, and a management apparatus configured to manage the virtualization control unit. The management apparatus includes a virtualization control management unit configured to detect a first fault caused in the virtualization control unit, and a network provision management unit configured to transmit notification data including a first countermeasure for the first fault to the processing apparatus. The network providing unit of the processing apparatus includes a notification reception unit configured to receive the notification data from the management apparatus, a detection unit configured to detect a second fault caused in the network providing unit and generate detection data including a second countermeasure for the second fault, and a countermeasure unit configured to execute a countermeasure associated with a condition satisfied by the notification data or the detection data with reference to priority data indicating a countermeasure given priority in a case where a predetermined condition is satisfied, out of the first countermeasure and the second countermeasure.

A processing method according to an aspect of the present invention includes virtualizing hardware by a processing apparatus, providing a network function by using a virtualized resources by the processing apparatus, detecting, by a management apparatus, a first fault caused in the step of virtualizing hardware, transmitting notification data including a first countermeasure for the first fault to the processing apparatus by the management apparatus, receiving the notification data from the management apparatus by the processing apparatus, detecting, by the processing apparatus, a second fault caused in the step of providing the network function and generating detection data including a second countermeasure for the second fault, and executing, by the processing apparatus, a countermeasure associated with a condition satisfied by the notification data or the detection data with reference to priority data indicating a countermeasure given priority in a case where a predetermined condition is satisfied, out of the first countermeasure and the second countermeasure.

An aspect of the present invention is a processing program for causing a computer to operate as the processing apparatus described above.

Effects of the Invention

According to the present invention, it is possible to provide a technique for causing a VNF to appropriately cope with a fault.

BRIEF DESCRIPTION OF DRAWINGS

FIG. 5 is a diagram illustrating an example of a data structure of priority data and an example of data.

FIG. 9 is a diagram illustrating examples of notification data and detection data according to an example.

DESCRIPTION OF EMBODIMENTS

Figure 1:
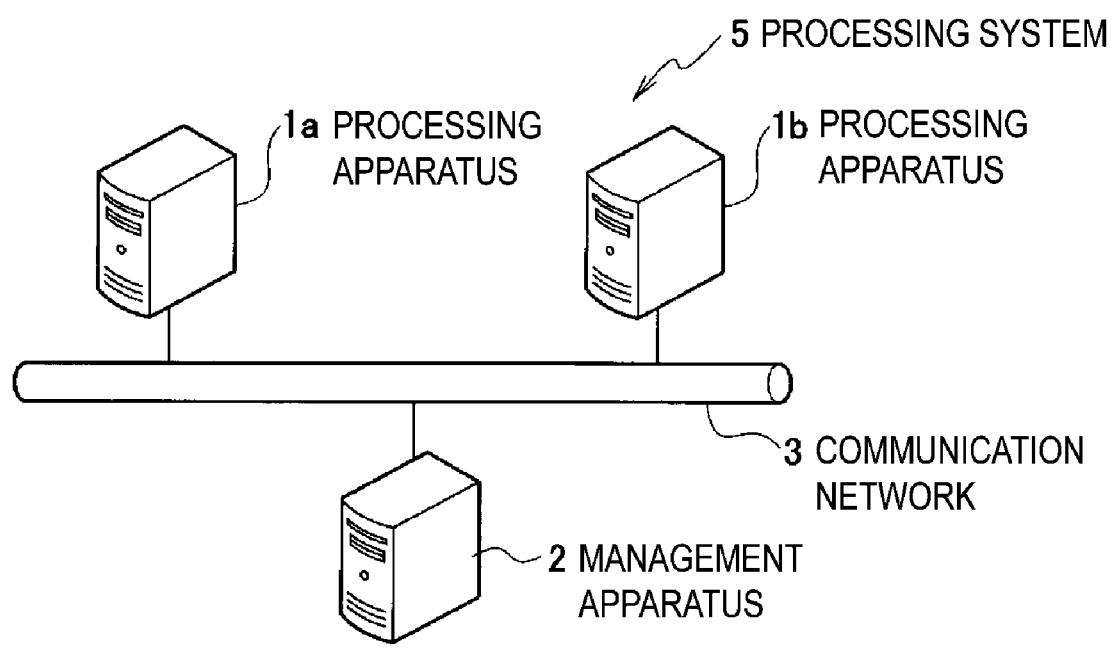
FIG. 1 is a diagram illustrating a system configuration of a processing system according to an embodiment of the present invention.

Hereinafter, an embodiment of the present invention will be described with reference to the drawings. Note that the same portions in the description of the drawings will be denoted by the same reference numerals and signs, and the description thereof will be omitted.

Processing System

A processing system 5 according to an embodiment of the present invention will be described with reference to FIG. 1. The processing system 5 includes a first processing apparatus 1a, a second processing apparatus 1b, and a management apparatus 2. The first processing apparatus 1a, the second processing apparatus 1b, and the management apparatus 2 are communicably connected to each other through a communication network 3.

Each of the first processing apparatus 1a and the second processing apparatus 1b provides a network service by using a network function based on an NFV technique. The first processing apparatus 1a and the second processing apparatus 1b may operate, for example, applications that achieve different functions or may be operated as an ACT system and an SBY system which have predetermined functions. In an embodiment of the present invention, the first processing apparatus 1a and the second processing apparatus 1b may be simply referred to as the processing apparatus 1 in a case where they are not particularly distinguished from one another.

The management apparatus 2 achieves NFV substrate, MANO.

Figure 2:
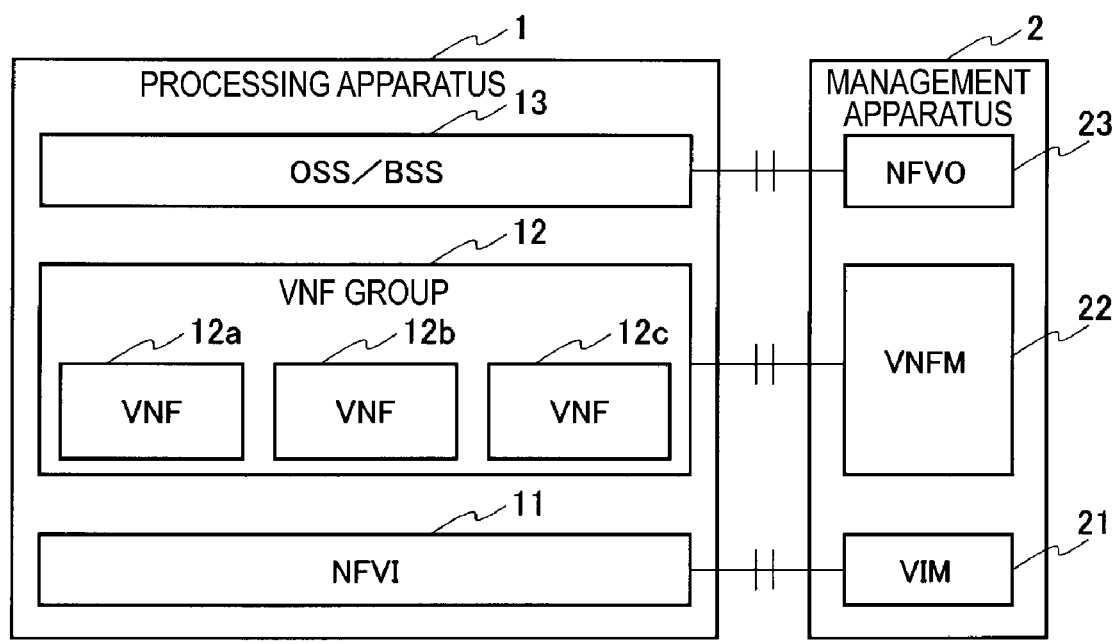
FIG. 2 is a diagram illustrating NFV reference architecture.

An NFV reference architecture adopted by the processing system 5 will be described with reference to FIG. 2. A function defined by the NFV reference architecture is classified into a function of providing a network service by using a virtual resource and a function of managing the function of providing a network service. The processing apparatus 1 is responsible for a function of providing a network service using virtual resources. The management apparatus is responsible for a function of managing the function of providing a network service.

The processing apparatus 1 provides functions of an NFV infrastructure (NFVI) 11, a virtual network function (VNF) group 12, and an operations support system/business support system (OSS/BSS) 13.

The NFVI 11 is an infrastructure for executing a VNF. The NFVI 11 is constituted by physical hardware resources such as a physical computer, a physical storage, and a physical network, and software called a virtualized layer to virtualize these physical hardware resources. The virtualized layer provides virtual resources such as a virtual computer, a virtual storage, and a virtual network to the VNF. Separating the VNF from hardware in the NFVI by a virtualization technique allows the NFVI 11 to be constructed with general-purpose products. In addition, a virtualization technique makes it possible to flexibly dispose the VNF regardless of an installation location of hardware.

The VNF group 12 includes VNFs 12a, 12b, and 12c. The VNFs 12a, 12b, and 12c are configured by connecting virtual resources provided from NFVI 11 to each other. The VNFs 12a, 12b, and 12c virtualize individual network functions that constitute a network of a communication carrier. The VNFs 12a, 12b, and 12c provide independent network functions by using a common NFVI. The VNFs 12a, 12b, and 12c are constituted by one or more virtual machines. A case where the VNF group 12 includes three VNFs will be described in FIG. 2. The number of VNFs included in the VNF group 12 does not matter.

The OSS/BSS 13 is a variety of work systems for providing a network service to end users. The OSS/BSS 13 provides a network service by using network functions provided by the VNFs.

The management apparatus 2 achieves a function of NFV management and orchestration (NFV MANO). The NFV MANO performs management and arbitration specific to virtualization for realizing a new operation in the NFV. The management apparatus 2 provides respective functions of a virtualized infrastructure manager (VIM) 21, a VNF manager (VNFM) 22, and an NFV orchestrator (NFVO) 23.

The VIM 21 manages respective resources of the physical computer, the physical storage, and the physical network in the NFVI 11. The VIM 21 generates virtual resources in response to requests from higher VNFM and NFVO.

The VNFM 22 is responsible for controlling VNF. The VNFM 22 is responsible for performing operations such as starting, stopping, scaling, and healing of the VNF as VNF lifecycle.

The NFVO 23 manages orchestration of the NFVI or a lifecycle of a network service.

Management Apparatus

Figure 3:
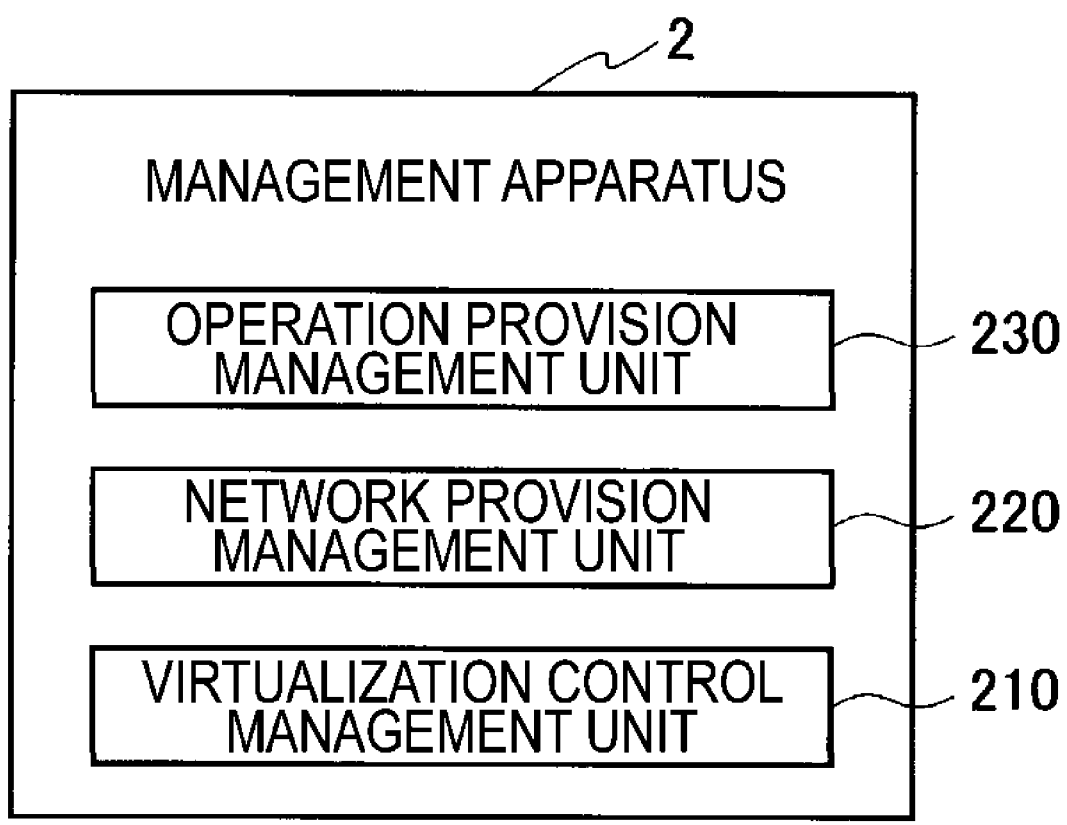
FIG. 3 is a diagram illustrating functional blocks of a management apparatus.

As illustrated in FIG. 3, the management apparatus 2 includes a virtualization control management unit 210, a network provision management unit 220, and an operation provision management unit 230.

The virtualization control management unit 210 achieves a VIM function. The network provision management unit 220 achieves a VNFM function. The operation provision management unit 230 achieves an NFVO function.

In the management apparatus 2 according to the embodiment of the present invention, the virtualization control management unit 210 monitors an NFVI function of the processing apparatus 1 and detects a fault of an NFV platform. The network provision management unit 220 is notified of a fault detected by the virtualization control management unit 210 (first fault). The network provision management unit 220 determines a countermeasure (first countermeasure) for a fault detected by the virtualization control management unit 210. The network provision management unit 220 transmits notification data including the determined countermeasure to the processing apparatus 1 to prompt the processing apparatus 1 to execute the countermeasure.

Processing Apparatus

Figure 4:
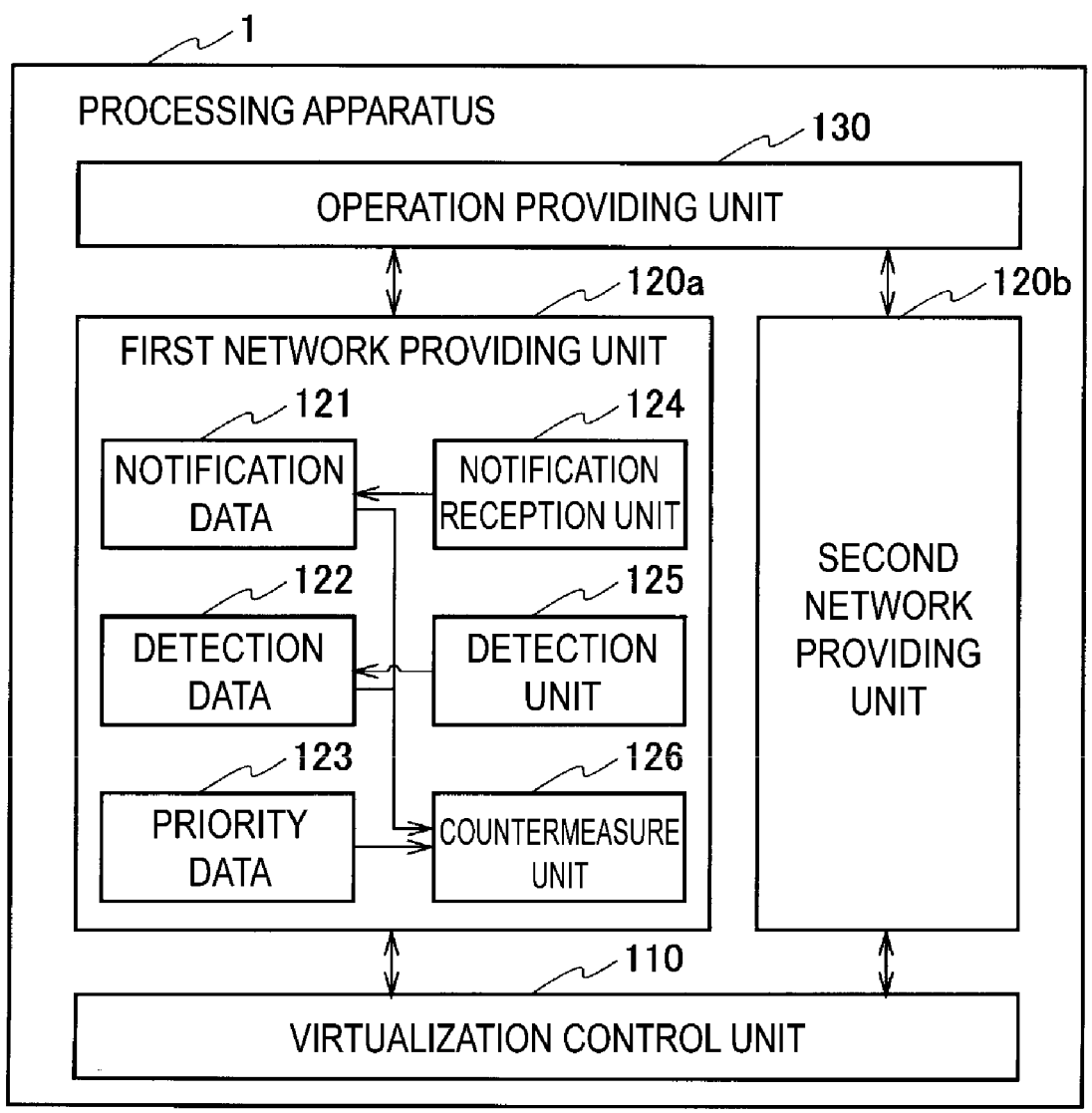
FIG. 4 is a diagram illustrating functional blocks of a processing apparatus.

As illustrated in FIG. 4, the processing apparatus 1 includes a virtualization control unit 110, a first network providing unit 120a, a second network providing unit 120b, and an operation providing unit 130.

The virtualization control unit 110 achieves an NFVI function. The virtualization control unit 110 virtualizes hardware. The virtualization control unit 110 provides virtual resources such as a virtual computer, a virtual storage, and a virtual network to the first network providing unit 120a and the second network providing unit 120b.

Each of the first network providing unit 120a and the second network providing unit 120b achieves a VNF function. Each of the first network providing unit 120a and the second network providing unit 120b provides a network function by using resources virtualized by the virtualization control unit 110.

The operation providing unit 130 achieves an OSS/BSS function. The operation providing unit 130 provides a network service to an end user by using a network function provided by the first network providing unit 120a or the second network providing unit 120b.

The first network providing unit 120a and the second network providing unit 120b provide network functions of different systems by using a common NFVI. The first network providing unit 120a and the second network providing unit 120b are simply referred to as a network providing unit 120 in a case where they are not distinguished from each other.

The first network providing unit 120a includes notification data 121, detection data 122, priority data 123, a notification reception unit 124, a detection unit 125, and a countermeasure unit 126, in addition to the processing units that achieve a VNF function. The notification data 121, the detection data 122, and the priority data 123 are stored in a virtual storage provided by the virtualization control unit 110. Executing a processing program by the virtual computer provided by the virtualization control unit 110 causes the notification reception unit 124, the detection unit 125, and the countermeasure unit 126 to be mounted on the virtual computer. The second network providing unit 120b may also have a function similar to that of the first network providing unit 120a.

The notification data 121 is data including a first countermeasure for the first fault caused in the virtualization control unit 110. The notification data 121 is generated by the management apparatus 2, received by and stored in the notification reception unit 124 to be described below. The notification data 121 includes a countermeasure for the first fault proposed by the management apparatus 2 (first countermeasure). The notification data 121 may include a content of the first fault in the virtualization control unit 110, detected by the management apparatus 2. The notification data 121 is generated and notified of by a functional unit or an apparatus other than the first network providing unit 120a.

The detection data 122 is data including a second countermeasure for the second fault caused in the network providing unit 120. The detection data 122 is generated by and stored in the detection unit 125. The detection data 122 includes a countermeasure for the second fault proposed by the detection unit 125 (second countermeasure). The detection data 122 may include a content of the second fault detected by the detection unit 125. The detection data 122 is generated by the first network providing unit 120a.

The priority data 123 indicates a countermeasure to be given priority in a case where a predetermined condition is satisfied, out of the first countermeasure and the second countermeasure. The priority data 123 is referred to determine which one of the first countermeasure and the second countermeasure is to be executed by the countermeasure unit 126. The priority data 123 is stored in advance before the priority data is referred to by the countermeasure unit 126. The predetermined condition relates to a detection entity of a fault, a content of a countermeasure, or a content of a fault.

For example, as illustrated in FIG. 5, the priority data 123 associates a condition and a priority target with each other. The condition is a condition for performing selection out of the first countermeasure and the second countermeasure. The priority target is data for identifying a countermeasure given priority, out of a countermeasure in the notification data 121 and a countermeasure in the detection data 122.

For example, in a case where a "detection entity of a fault" is associated as a condition and "inside" is associated as a priority target, the priority data 123 stipulates that the detection entity of a fault gives priority to an internal countermeasure, specifically the second countermeasure determined by the network providing unit 120. In a case where the "content of a countermeasure" is associated as a condition and the "system switching" is associated as a priority target, the priority data 123 stipulates that a countermeasure in which system switching is designated as content of a countermeasure is given priority. Further, in a case where content of a fault is included in each of the notification data 121 and the detection data 122 and the "content of a fault" is associated as a condition, it is stipulated that a countermeasure in which a fault target designated as a priority target is associated is given priority.

The priority data 123 may only include a set of stipulations in which a condition and a priority target are associated with each other or may include a plurality of sets of stipulations. In a case where the priority data 123 includes a plurality of sets of stipulations, the order of priority is set for each set, and it may be determined whether or not a set of stipulations matches a condition in descending order of priority. In addition, the priority data 123 may be formed such that a priority target is determined based on a plurality of conditions.

The notification reception unit 124 receives the notification data 121 including the first countermeasure for the first fault caused in the virtualization control unit 110 from the management apparatus 2 that manages the virtualization control unit 110. The notification reception unit 124 stores the received notification data 121 in a storage apparatus.

The detection unit 125 detects the second fault caused in the network providing unit 120 and generates the detection data 122 including a second countermeasure for the second fault. Here, the second fault is a fault detected by the network providing unit 120 itself. The second fault may be a fault that is induced and caused by the first fault or may be a fault that does not synchronize with the first fault. The detection unit 125 stores the generated detection data 122 in the storage apparatus. The detection unit 125 detects a fault, for example, by a fault detection method in an existing network function which does not use a virtual machine.

The countermeasure unit 126 executes a countermeasure associated with a condition satisfied by the notification data 121 or the detection data 122, with reference to the priority data 123. The countermeasure unit 126 compares the notification data 121 with the detection data 122, and selects a countermeasure suitable for a condition stipulated by the priority data 123.

For example, in a case where a "detection entity of a fault" is associated as a condition, and "inside" is associated as a priority target, the countermeasure unit 126 copes with a fault in accordance with the second countermeasure of the detection data 122 generated by the network providing unit 120. In a case where "content of a countermeasure" is associated as a condition and "system switching" is associated as a priority entity, the countermeasure unit 126 copes with a fault in accordance with a countermeasure in which "system switching" is set as the content of a countermeasure. In a case where the content of a fault is included in each of the notification data 121 and the detection data 122 and the "content of the fault" is associated as a condition, the countermeasure unit 126 copes with a fault in accordance with a countermeasure associated with a fault target.

The countermeasure unit 126 determines which countermeasure is to be adopted, with reference to the priority data 123 in a case where the notification data 121 and the detection data 122 are both generated.

The countermeasure unit 126 may select either of the countermeasures with reference to the priority data 123 in a case where, for example, the first countermeasure indicated by the notification data 121 and the second countermeasure indicated by the detection data 122 conflict with each other. Here, the case of conflict is a case where both countermeasures cannot be executed at the same time. For example, a restart escalation function for expanding a range (phase) in which restart (reset) is performed gradually when a fault occurs is known. In designating restart escalation in which different phases are designated in the first countermeasure and the second countermeasure, the countermeasure unit 126 determines that the first countermeasure and the second countermeasure conflict with each other.

In addition, the countermeasure unit 126 may determine whether or not the first countermeasure and the second countermeasure conflict with each other with reference to a table in which the first countermeasure and the second countermeasure that conflict with each other are associated with each other. In the table indicating a case of conflict, for example, restart escalation in which different phases are designated as the first countermeasure and the second countermeasure is set.

The countermeasure unit 126 may cope with a fault in accordance with any one of the first countermeasure and the second countermeasure with reference to the priority data 123 even when the first countermeasure and the second countermeasure do not conflict with each other. For example, in a case where the notification data 121 and the detection data 122 are generated at the same time or within a predetermined period of time, it is thought that a fault generated by the virtualization control unit 110 might have caused the network providing unit 120 to detect a fault. Accordingly, for example, even when the notification data 121 or the detection data 122 is generated, the countermeasure unit 126 may wait for a predetermined period of time without immediately executing the countermeasure. In a case where both the notification data 121 and the detection data 122 are prepared while the countermeasure unit 126 waits for a predetermined period of time, the countermeasure unit 126 may cope with a fault in accordance with either of the countermeasures with reference to the priority data 123.

The countermeasure unit 126 may refer to a table for identifying a case related to the first fault and the second fault, such as the detection of a fault, induced by a fault generated in the virtualization control unit 110, in the network providing unit 120. The countermeasure unit 126 may determine whether or not there is a relation between the first fault notified of by the management apparatus 2 and the second fault detected by the network providing unit 120, with reference to the table. In a case where there is a relation between the first and second faults, the countermeasure unit 126 may cope with a fault in accordance with either the first countermeasure or the second countermeasure, with reference to the priority data 123.

In a case where the first countermeasure and the second countermeasure are the same, the countermeasure unit 126 may execute the countermeasure without reference to the priority data 123.

In a case other than the cases described above, the countermeasure unit 126 may execute both of the countermeasures in the notification data 121 and the detection data 122. Examples of a case other than the cases described above include a case where the notification data 121 and the detection data 122 indicate the same countermeasure, a case where the notification data 121 and the detection data 122 are not generated at the same time or within a predetermined period of time, a case where the countermeasure in the notification data 121 and the countermeasure in the detection data 122 do not conflict with each other, a case where there is no relation between the first and second faults, and the like.

Processing Method

Figure 6:
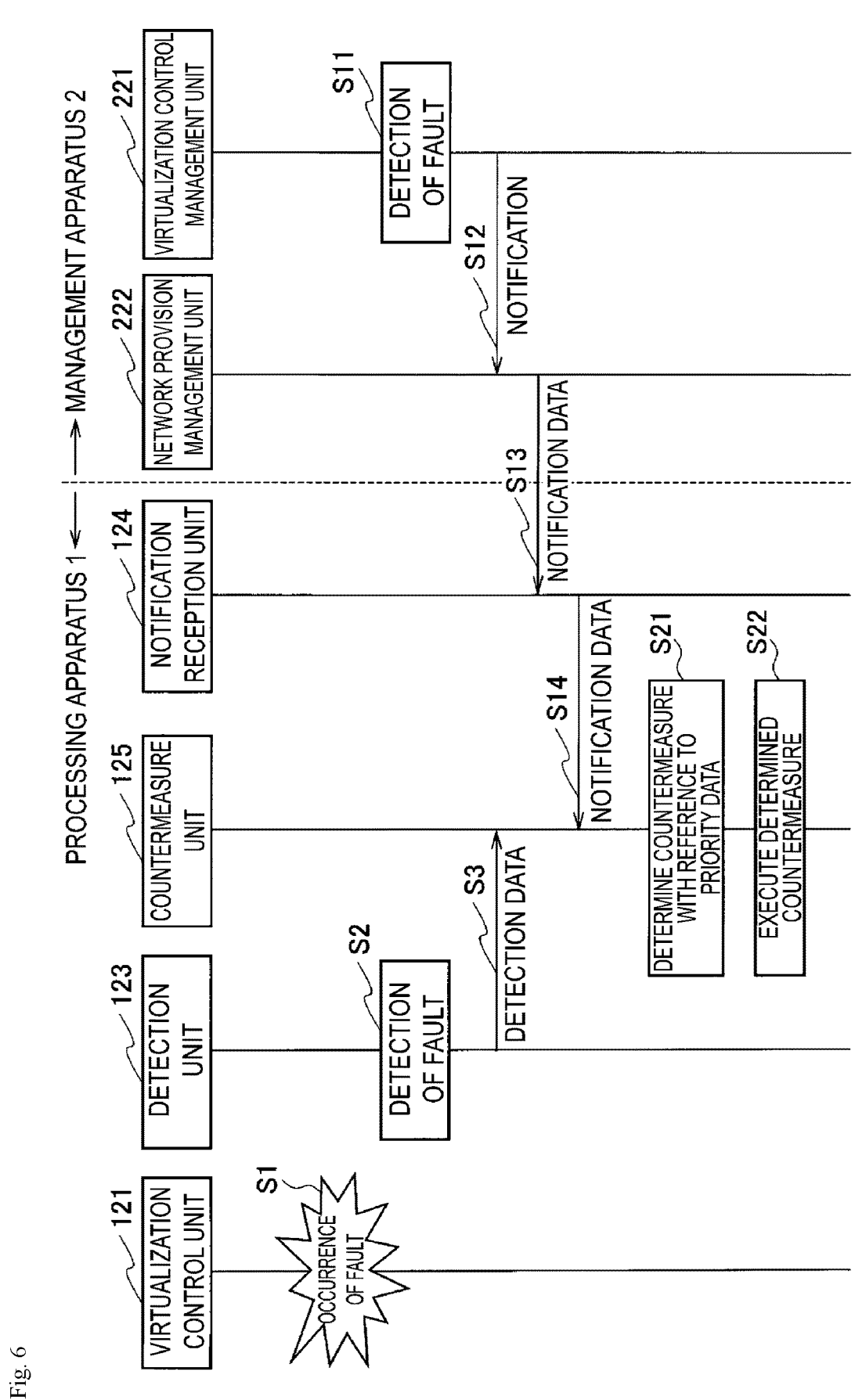
FIG. 6 is a sequence diagram illustrating a processing method.

A processing method according to an embodiment of the present invention will be described with reference to FIG. 6.

First, in step S1, a fault is generated in the virtualization control unit 110 of the processing apparatus 1.

In step S2, the detection unit 125 of the processing apparatus 1 detects a fault. In step S3, the detection unit 125 generates the detection data 122 including a countermeasure for a fault and stores the detection data 122 in a storage apparatus.

In step S11, the virtualization control management unit 210 of the management apparatus 2 detects a fault. In step S12, the virtualization control management unit 210 notifies the network provision management unit 220 that a fault has been detected. The network provision management unit 220 generates notification data 121 including a countermeasure for the fault notified of by the virtualization control management unit 210. In step S13, the network provision management unit 220 transmits the notification data 121 to the processing apparatus 1. The notification reception unit 124 receives the notification data from the management apparatus 2 and stores the notification data in the storage apparatus.

In step S21, the countermeasure unit 126 determines which one of the countermeasure in the detection data 122 stored in step S3 and the countermeasure in the notification data 121 stored in step S14 is to be adopted, with reference to the priority data 123. In step S22, the countermeasure unit 126 executes the countermeasure determined in step S21.

According to such a processing system 5 according to the embodiment of the present invention, a VNF can appropriately cope with a fault. Even when a fault is generated in the processing apparatus 1 and a countermeasure proposed by MANO and a countermeasure proposed by the VNF conflict with each other, the VNF can determine a countermeasure to be adopted by the VNF with reference to the priority data 123.

Mounting Example

Figure 7:
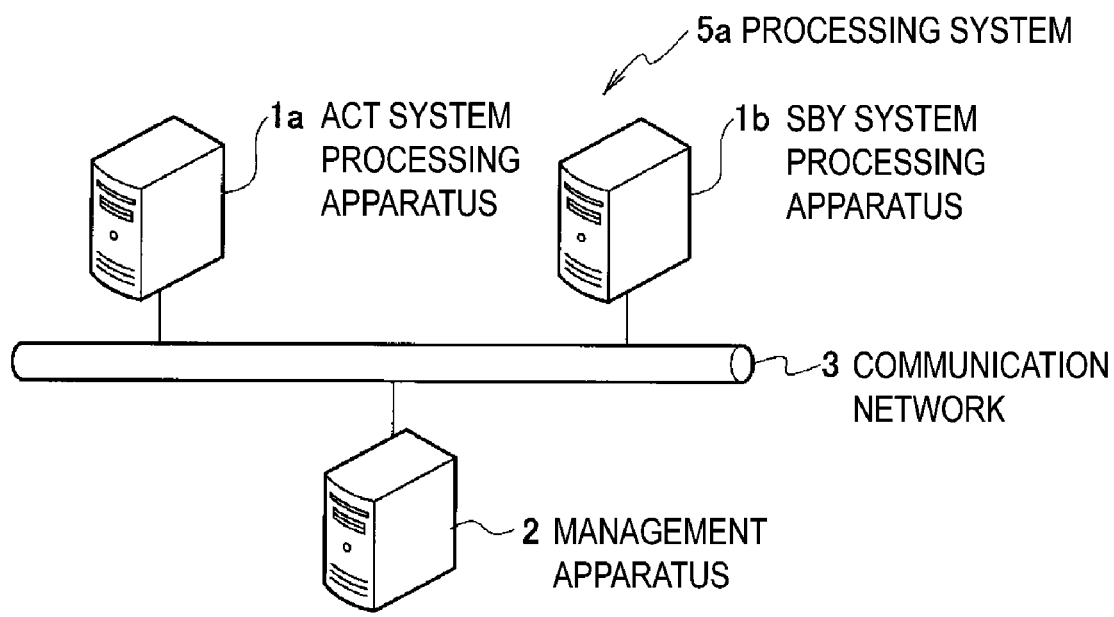
FIG. 7 is a diagram illustrating a system configuration of a processing system according to an example.
Figure 8:
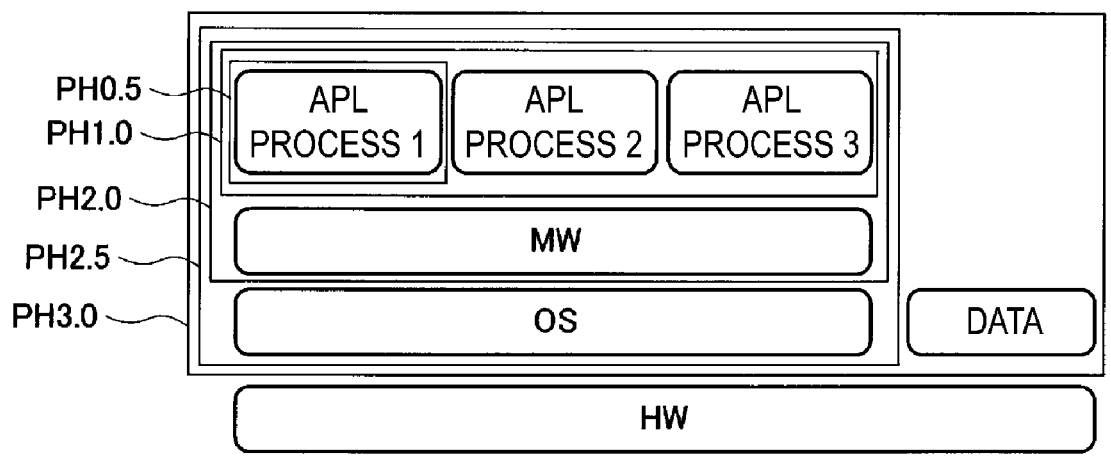
FIG. 8 is a diagram illustrating restart escalation.

A processing system 5a according to a mounting example will be described with reference to FIGS. 7 to 9. The processing system 5a includes an ACT system processing apparatus 1a, an SBY system processing apparatus 1b, and a management apparatus 2. The ACT system processing apparatus 1a and the SBY system processing apparatus 1b achieve the functions described with reference to FIG. 4. The management apparatus 2 achieves the functions described with reference to FIG. 3.

As described in the embodiments, the ACT system processing apparatus 1a and the SBY system processing apparatus 1b provide a network service by using a network function based on an NFV technique. The ACT system processing apparatus 1a and the SBY system processing apparatus 1b control a call between communication terminals (not illustrated). The ACT system processing apparatus 1a and the SBY system processing apparatus 1b respectively operate as an act system and a standby system of a predetermined network service. Hardware used in the ACT system processing apparatuses 1a and hardware used in the SBY system processing apparatus 1b are distinguished from each other. However, information on a call to be controlled by the ACT system processing apparatuses 1a and the SBY system processing apparatus 1b are stored in a shared memory (not illustrated) and shared.

In such a processing system 5a, it is assumed that a first countermeasure in notification data 121 transmitted by the management apparatus 2 and a second countermeasure in detection data 122 generated by the ACT system processing apparatus 1a all designate phases in a restart escalation function.

Here, restart escalation is described with reference to FIG. 8. The restart escalation minimizes the influence of a fault on a service in a manner that the range of restart (reset) is expanded gradually in a case where a fault is generated. A target to be restarted is stipulated by a phase (PH). In the example illustrated in FIG. 6, when PH0.5 is designated, a designated process is reset. When the value of PH increases, the range of reset becomes wider, and when the PH3.0 is designated, an operating system (OS) and data are reset.

The notification data 121 transmitted by the management apparatus 2 is intended to system switching as illustrated in FIG. 8(a) and proposes a countermeasure for performing restart with PH2.5 in a new SBY system after the system switching is performed. On the other hand, the detection data 122 proposes a countermeasure for performing restart with PH2.5 in the state of an ACT system without performing system switching as illustrated in FIG. 8(b).

The countermeasure indicated by the notification data 121 in FIG. 8(a) has an advantage that a service is not discontinued by switching a processing system from the ACT system processing apparatus 1a to the SBY system processing apparatus 1. In addition, since a shared memory referred to by both the ACT system processing apparatus 1a and the SBY system processing apparatus 1b is not cleared, there is also an advantage that a currently ongoing call is remedied. However, since the shared memory is not cleared, there is a possibility that the STB system will take over memory information that may have a fault, and the fault may not be resolved.

The countermeasure indicated by the detection data in FIG. 8(b) does not switch a processing system from the ACT system processing apparatus 1a to the SBY system processing apparatus 1, and the ACT system processing apparatus 1a performs reset after clearing the shared memory with PH2.5 and then continues processing, which leads to a disadvantage that a call is not remedied, and it takes time to restart a service. However, since the shared memory is cleared, it is possible to clear memory information that may have a fault and increase the possibility of the fault being resolved.

The countermeasures illustrated in FIGS. 8(a) and 8(b) are incompatible and compete with each other in terms of whether a system is switched or not. The countermeasure unit 126 determines which countermeasure is to be adopted, with reference to the priority data 123. The countermeasure unit 126 executes the determined countermeasure.

Figure 10:
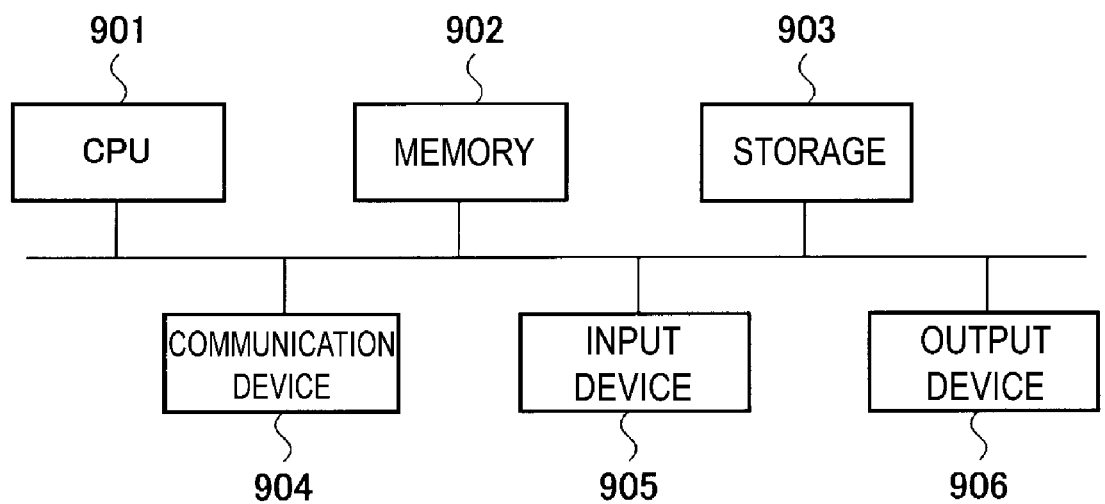
FIG. 10 is a diagram illustrating a hardware configuration of a computer used in the processing apparatus.

As the processing apparatus 1 described above according to the present embodiment, as illustrated in FIG. 10, for example, a general-purpose computer system including a central processing unit (CPU; a processor) 901, a memory 902, a storage (a hard disk drive (HDD) or a solid state drive (SSD)) 903, a communication device 904, an input device 905, and an output device 906 is used. The memory 902 and the storage 903 are storage apparatuses. In the computer system, each function of the processing apparatus 1 is achieved by the CPU 901 executing a predetermined program loaded on the memory 902.

The processing apparatus 1 according to the embodiment of the present invention provides a network function using virtual resources obtained by virtualizing physical hardware resources such as a computer, a storage, or a network device. The processing apparatus 1 provides a network service using a provided network function.

The program for the processing apparatus 1 may be stored in a computer-readable recording medium such as a HDD, a SSD, a universal serial bus (USB) memory, a compact disc (CD), or a digital versatile disc (DVD) or may be distributed via a network.

The present invention is not limited to the embodiment, and various modifications can be made within the scope of the gist of the present invention.

REFERENCE SIGNS LIST

1 Processing apparatus
2 Management apparatus
3 Communication network
5 Processing system
11 NFVI
12 VNF group
13 OSS/BSS
21 VIM
22 VNFM
23 NFVO 110 Virtualization control unit
120 Network providing unit
121 Notification data
122 Detection data
123 Priority data
124 Notification reception unit
125 Detection unit
126 Countermeasure unit
130 Operation providing unit
210 Virtualization control management unit
220 Network provision management unit
230 Operation provision management unit
901 CPU
902 Memory
903 Storage
904 Communication device
905 Input device
906 Output device

The invention claimed is:

1. A processing apparatus comprising:
a virtualization control unit, including one or more processors, configured to virtualize physical hardware; and
a network providing unit, including one or more processors, configured to provide a network function by using a resource virtualized by the virtualization control unit,
wherein the network providing unit includes one or more processors configured to:
receive, from a management apparatus configured to manage the virtualization control unit, notification data including a first countermeasure for a first fault caused in the virtualization control unit that is outside the network providing unit, wherein the first countermeasure includes a system switching into a standby system and a restart of the standby system;
detect a second fault caused inside the network providing unit and generate detection data including a second countermeasure for the second fault, wherein the second countermeasure includes a restart without performing the system switching, wherein the first fault outside the network providing unit and the second fault inside the network providing unit occurred at the same time or within a predetermined period of time;
determine that the first countermeasure and the second countermeasure conflict with each other,
determine that the notification data or the detection data satisfy a predetermined condition;
determine a prioritized countermeasure out of the first countermeasure and the second countermeasure under the predetermined condition; and
execute the prioritized countermeasure.

2. The processing apparatus according to claim 1, wherein the predetermined condition relates to a detection entity of a fault, a content of a countermeasure, or a content of a fault.

3. A processing system according to claim 1, comprising:
the processing apparatus; and
the management apparatus, wherein
the management apparatus includes:
a virtualization control management unit, including one or more processors, configured to detect a first fault caused in the virtualization control unit; and
a network provision management unit, including one or more processors, configured to transmit notification data including a first countermeasure for the first fault to the processing apparatus.

4. A processing method comprising:
virtualizing, by a processing apparatus, physical hardware;
providing, by the processing apparatus, a network function by using a virtualized resource;
detecting, by a management apparatus, a first fault caused in the step of virtualizing the physical hardware;
transmitting, by the management apparatus, notification data including a first countermeasure for the first fault to the processing apparatus, wherein the first countermeasure includes a system switching into a standby system and a restart of the standby system;
receiving, by the processing apparatus, the notification data from the management apparatus;
detecting, by the processing apparatus, a second fault caused in the step of providing the network function and generating detection data including a second countermeasure for the second fault, wherein the second countermeasure includes a restart of the processing apparatus without performing the system switching, wherein the first fault caused in the step of virtualizing the physical hardware and the second fault causes in the step of providing the network function occurred at the same time or within a predetermined period of time;
determining, by the processing apparatus, that the first countermeasure and the second countermeasure conflict with each other,
determining, by the processing apparatus, that the notification data or the detection data satisfy a predetermined condition;
determining, by the processing apparatus, a prioritized countermeasure out of the first countermeasure and the second countermeasure under the predetermined condition; and
executing, by the processing apparatus, the prioritized countermeasure.

5. A non-transitory computer readable medium storing one or more instructions for causing a computer to operate as a processing apparatus to execute:
virtualizing, by the processing apparatus, hardware;
virtualizing, by a processing apparatus, physical hardware;
providing, by the processing apparatus, a network function by using a virtualized resource;
receiving, by the processing apparatus from a management apparatus that detects a first fault caused in the step of virtualizing the physical hardware, notification data including a first countermeasure for the first fault, wherein the first countermeasure includes a system switching into a standby system and a restart of the standby system;
detecting, by the processing apparatus, a second fault caused in the step of providing the network function and generating detection data including a second countermeasure for the second fault, wherein the second countermeasure includes a restart of the processing apparatus without performing the system switching, wherein the first fault caused in the step of virtualizing the physical hardware and the second fault causes in the step of providing the network function occurred at the same time or within a predetermined period of time;
determining, by the processing apparatus, that the first countermeasure and the second countermeasure conflict with each other, determining, by the processing apparatus, that the notification data or the detection data satisfy a predetermined condition;

determining, by the processing apparatus, a prioritized countermeasure out of the first countermeasure and the second countermeasure under the predetermined condition; and executing, by the processing apparatus, the prioritized countermeasure.

6. The processing method according to claim 4, wherein the predetermined condition relates to a detection entity of a fault, a content of a countermeasure, or a content of a fault.

7. The non-transitory computer readable medium according to claim 5, wherein the predetermined condition relates to a detection entity of a fault, a content of a countermeasure, or a content of a fault.

* * * * *